(12) United States Patent
Gupta

(10) Patent No.: US 9,413,483 B2
(45) Date of Patent: Aug. 9, 2016

(54) PASSIVE OPTICAL NETWORK DIGITAL SUBSCRIBER LINE CONVERGENCE ARCHITECTURE

(71) Applicant: Futurewei Technologies, Inc., Plano, TX (US)

(72) Inventor: Sanjay Gupta, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 521 days.

(21) Appl. No.: 13/779,514

(22) Filed: Feb. 27, 2013

(65) Prior Publication Data

US 2013/0230324 A1 Sep. 5, 2013

Related U.S. Application Data

(60) Provisional application No. 61/606,023, filed on Mar. 2, 2012.

(51) Int. Cl.
| | |
|---|---|
| *H04J 14/02* | (2006.01) |
| *H04Q 11/00* | (2006.01) |
| *H04L 12/28* | (2006.01) |
| *H04L 12/24* | (2006.01) |
| *H04M 11/06* | (2006.01) |

(52) U.S. Cl.
CPC ......... *H04J 14/0227* (2013.01); *H04L 12/2885* (2013.01); *H04L 41/00* (2013.01); *H04Q 11/0067* (2013.01); *H04M 11/062* (2013.01); *H04Q 11/0071* (2013.01); *H04Q 2011/0079* (2013.01)

(58) Field of Classification Search
None
See application file for complete search history.

(56) References Cited

U.S. PATENT DOCUMENTS

| | | | | |
|---|---|---|---|---|
| 2002/0075902 | A1* | 6/2002 | Abbas et al. | 370/474 |
| 2004/0136712 | A1* | 7/2004 | Stiscia et al. | 398/60 |
| 2006/0133809 | A1* | 6/2006 | Chow et al. | 398/66 |
| 2006/0228113 | A1 | 10/2006 | Cutillo et al. | |
| 2007/0297446 | A1* | 12/2007 | Siwko | H04B 10/272 370/468 |
| 2008/0063007 | A1 | 3/2008 | Christiaens et al. | |
| 2008/0298311 | A1* | 12/2008 | Zha et al. | 370/328 |
| 2009/0138775 | A1* | 5/2009 | Christiaens et al. | 714/748 |
| 2009/0232498 | A1* | 9/2009 | Tsuge et al. | 398/58 |
| 2011/0026414 | A1* | 2/2011 | Banerjee | 370/252 |
| 2011/0116796 | A1* | 5/2011 | Zheng | 398/45 |

(Continued)

FOREIGN PATENT DOCUMENTS

WO 2010082879 A1 7/2010

OTHER PUBLICATIONS

TR-101, "Migration to Ethernet-Based Broadband Aggregation," The Broadband Forum, Technical Report, Issue: 2, Jul. 2011, pp. 1-101.

(Continued)

*Primary Examiner* — Noel Beharry
*Assistant Examiner* — Rodrick Mak
(74) *Attorney, Agent, or Firm* — Conley Rose, P.C.; Grant Rodolph; Adam J. Stegge

(57) ABSTRACT

A method of communicating using an optical line terminal (OLT), the method comprising acquiring encapsulated data by a digital subscriber line (DSL) physical media specific transmission convergence (PMS-TC) sublayer from a protocol specific transmission convergence (TPS-TC) sublayer, and framing the encapsulated data into a frame by the PMS-TC sublayer for transmission to a corresponding PMS-TC sublayer in a customer premises equipment (CPE).

7 Claims, 12 Drawing Sheets

(56) References Cited

U.S. PATENT DOCUMENTS

| | | | |
|---|---|---|---|
| 2012/0121265 A1* | 5/2012 | Suvakovic | H04B 10/272 398/66 |
| 2013/0004155 A1* | 1/2013 | Liang et al. | 398/9 |
| 2013/0083673 A1* | 4/2013 | Chow | H04L 12/2885 370/252 |

OTHER PUBLICATIONS

TR-156, "Using GPON Access in the context of TR-101," The Broadband Form, Technical Report, Issue: 2, Sep. 2010, pp. 1-50.

TR-167, "GPON-fed TR-101 Ethernet Access Node," The Broadband Form, Technical Report, Issue: 2, Sep. 2010, pp. 1-30.

"Series G: Transmission Systems and Media, Digital Systems and Networks—Digital sections and digital line system—Optical line systems for local and access networks, Gigabit-Capable Passive Optical Networks (G-PON): Transmission Convergence Layer Specification," ITU-T G.984.3, (Mar. 2008).

"Series G: Transmission Systems and Media, Digital Systems and Networks—Digital sections and digital line system—Access Networks, Very High Speed Digital Subscriber Line Transceivers 2 (VDSL2)," ITU-T G.993.2, (Dec. 2011).

"G.fast: Architecture Aspects of G.fast.," ITU—Telecommunication Standardization Sector, Study Group 15, 11RV-045, Atcatel-Lucent, Richmond, VA, Nov. 3-10, 2011, pp. 1-10.

"Series G: Transmission System and Media, Digital Systems and Networks, Digital Sections and Digital Line System—Access Networks, Very High Speed Digital Subscriber Line Transceivers 2 (VDSL2)," ITU-T Standard, International Telecommunication Union, Geneva, Switzerland, G.993.2, Dec. 16, 2011, 376 pages.

"Series G: Transmission System and Media, Digital System and Networks, Wireline Broadband Access Networks and Home Networking," ITU-T Technical Paper, International Telecommunication Union, Geneva, Switzerland, Dec. 1, 2011, 324 pages.

Foreign Communication From a Counterpart Application, PCT Application No. PCT/US2013/028071, International Search Report dated Jul. 19, 2013, 5 pages.

Foreign Communication From a Counterpart Application, PCT Application No. PCT/US2013/028071, Written Opinion dated Jul. 19, 2013, 7 pages.

* cited by examiner

PASSIVE OPTICAL NETWORK DIGITAL SUBSCRIBER LINE CONVERGENCE ARCHITECTURE

CROSS-REFERENCE TO RELATED APPLICATIONS

The present application claims priority to U.S. Provisional Patent Application No. 61/606,023 filed Mar. 2, 2012 by Sanjay Gupta and entitled "PON DSL Convergence Architecture", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to meet today's high speed data service requirements, typical access networks that connect customers to service providers have evolved to hybrid fiber/copper networks. These networks may comprise a remote terminal located close to the customer with a copper drop to the customer premises and a fiber optic connection to the central office. The copper link may use a high speed digital subscriber line (DSL) technology to connect the remote terminal and the customer premises, while the fiber link may use a variant of optical technology such as a passive optical network (PON) to connect to the central office.

The current fiber/copper network architecture may be limited by the high complexity of the remote node which terminates the DSL. Managing the copper link may also be costly as any physical layer issues can inevitably lead to a truck roll to the remote node or customer premises. Additionally, the remote node may be installed in locations with severe space constraints which prohibit loop unbundling. With deeper fiber penetration, today's remote node may be getting installed closer and closer to the customer premises, serving less customers, each with ever higher bandwidth requirements. As a result, there is a demand for high bandwidth, low density, and low complexity remote terminals that are easy to manage.

SUMMARY

In one embodiment, the disclosure includes a method of communicating using an optical line terminal (OLT), the method comprising acquiring encapsulated data by a DSL physical media specific transmission convergence (PMS-TC) sublayer from a transmission protocol specific transmission convergence (TPS-TC) sublayer, and framing the encapsulated data into a frame by the PMS-TC sublayer for transmission to a corresponding PMS-TC sublayer in a customer premises equipment (CPE).

In another embodiment, the disclosure includes an OLT comprising a processor configured to fragment data into DSL payload data frames, prioritize transmission of the DSL payload data frames, and schedule transmission of the DSL payload data frames, and a transmitter configured to transmit the DSL payload data frames over an optical link.

In yet another embodiment, the disclosure includes an OLT comprising a processor configured to schedule DSL operations and management (OAM) frames in coordination with a dynamic bandwidth allocation (DBA) agent in a DSL control and management plane.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms are used herein: digital subscriber line (DSL), asymmetric DSL (ADSL), very-high-bit-rate DSL (VDSL), passive optical network (PON), Gigabit PON (GPON), Ethernet PON (EPON), point-to-point (P2P), optical line terminal (OLT), optical network unit (ONU), drop-point (DP), optical distribution network (ODN), copper network termination unit (CNU), G.Fast Transceiver Unit (FTU), remote gateway (RG), customer premises equipment (CPE), customer premises network (CPN), fiber-to-the-drop-point (FTT-DP), central office (CO), transmission convergence (TC), physical media dependent (PMD), management protocol specific (MPS), transmission protocol specific (TPS), physical media specific (PMS), operations, administration & management (OAM), interface (UF), physical layer operations, administration, & management (PLOAM), ONU management and control interface (OMCI), GPON transmission convergence (GTC), GPON encapsulation method (GEM), dynamic bandwidth allocation control (DBA CTRL), analog front end (AFE), twisted pair (TP), digital processing (DP), signal processing (SP), inverse discrete Fourier transform (IDFT), fast Fourier transform (FFT), digital-to-analog (D/A), analog-to-digital (A/D), frequency-domain equalizer (FEQ), firmware (FW), access function (AF), DSL access multiplexer (DSLAM), transmit function (TX), receive function (RX), Reed-Solomon (RS), Quality of Service (QOS), Virtual Local Area Network Identifier (VID), parity bit (P-bit), forward error correction (FEC), signal-to-noise-ratio (SNR), Institute of Electrical and Electronics Engineers (IEEE), embedded operations channel (EOC), VDSL transceiver unit (VTU), and traffic/transmission containers (T-CONT). Depending on the supported standard, a DSL system may be denoted as an xDSL system where 'x' may indicate any DSL standard. For instance, 'x' may stand for 'A' in ADSL2 or ADSL2+ systems, 'V' in VDSL or VDSL2 systems, or 'F' in G.fast systems.

Figure 1:
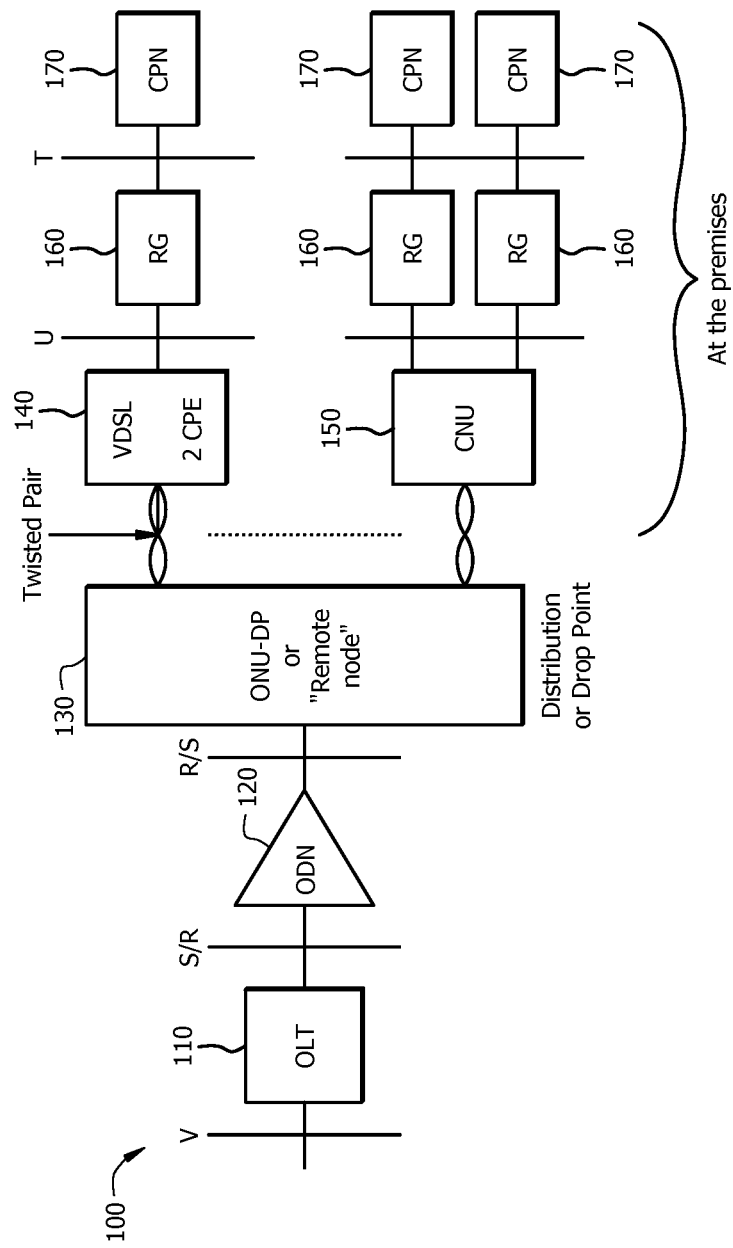
FIG. 1 is a schematic diagram of an embodiment of a conventional hybrid optical/copper access architecture.

FIG. 1 illustrates an embodiment of a conventional hybrid fiber/copper access architecture 100. This document uses GPON and VDSL2 technologies as examples for the fiber and copper link, respectively, for the purposes of illustration. As a person of ordinary skill in the art will readily recognize, the disclosed embodiments may be equally applied to other optical technologies (such as P2P optical and EPON) and DSL technologies (such as ADSL2 and G.FAST) that are used in the hybrid optical/copper access network. The architecture 100 may comprise an OLT 110, an ODN 120, an ONU-DP or remote node 130, a VDSL2-CPE 140, a CNU 150, a RG 160, and CPNs 170 configured as shown in FIG. 1. An S/R interface may be between the OLT 110 and ODN 120, while a R/S interface may be located between the ODN 120 and ONU-DP 130. A V interface may be at the downstream side of the OLT 110 that faces the fiber coupled to the service provider. On the customer premises side, a U interface may be located between the ONU-DP 130 and the RG 160, with a T interface positioned following the RG 160 and before the CPNs 170. From the remote node 130, the VDSL2 CPE 140 or another DSL technology such as G.Fast may be used in deployment. In an embodiment, the RG 160 may be integrated in the VDSL2-CPE 140 or the CNU 150. The RG 160 may be a Wi-Fi router or other type of home router as examples. A CPN 170 may be a computer or table device for accessing the Internet as examples. The CNU 150 may also be connected to multiple users at the CPNs 170. The hybrid fiber/copper access architecture 100 may be referred to as a PON DSL architecture.

Figure 2:
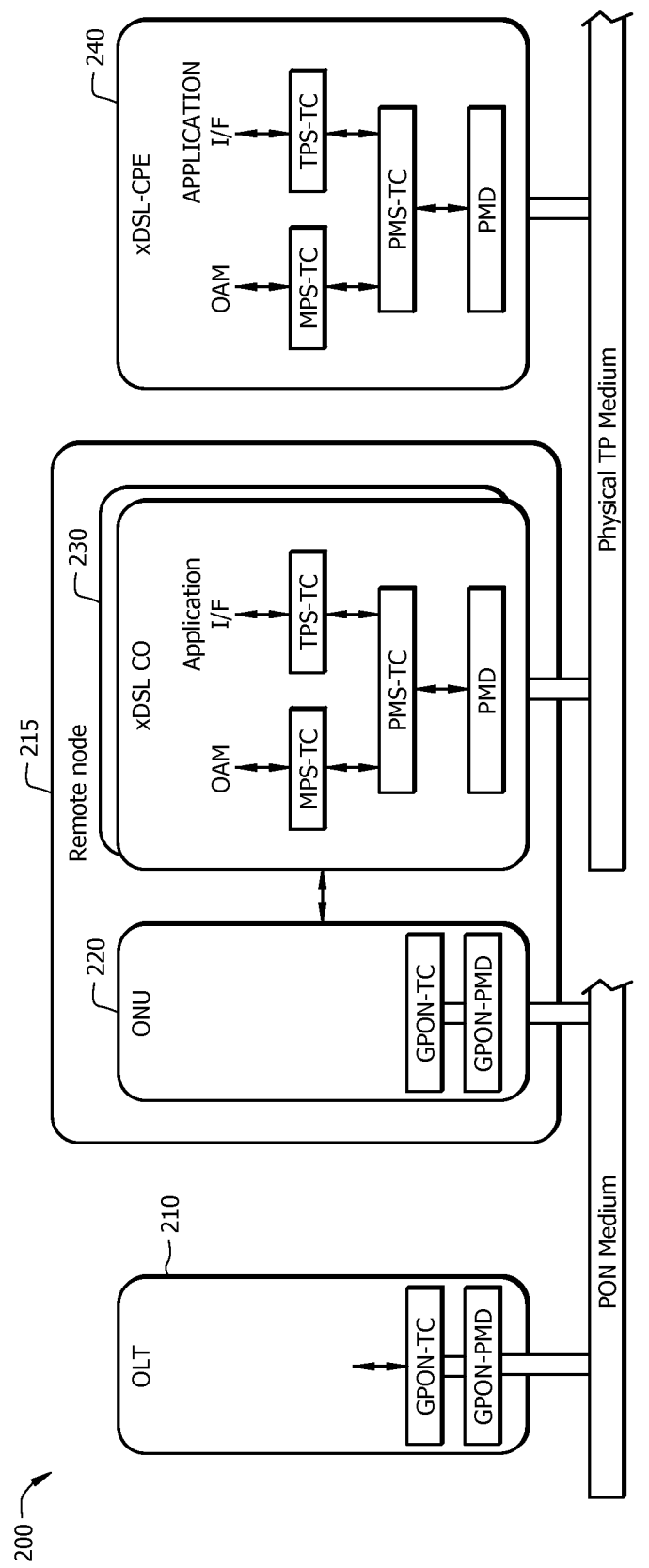
FIG. 2 is a functional block diagram of an embodiment of conventional remote node access point architecture.

FIG. 2 is a functional diagram of an embodiment of a conventional PON DSL architecture 200. The architecture 200 may comprise an OLT 210, a remote node 215, and an xDSL-CPE 240. The OLT 210 may be the same as OLT 110, and the remote node 215 may be the same as the ONU-DP 130. The remote node 215 may comprise an ONU or optical processing section 220 cascaded with an xDSL-CO processing section 230. For example, Ethernet frames received from the ONU 220 may be partitioned by the xDSL-CO section 230 and subsequently encoded and modulated for transmission on the copper link. The xDSL-CO section 230 may implement the protocol functions and may manage the remote terminal xDSL-CPE 240 using an OAM channel multiplexed into the user data frame. The OLT 210 and ONU 220 may use an optical technology such as GPON, in which the user data frames may be processed by the GPON-TC and GPON-PMD protocols and afterwards transported on a fiber link or PON medium. The remote node 215 may have many instances of copper drops to customer premises. The xDSL-CO section 230 may implement TPS-TC, PMS-TC, MPS-TC, and PMD functions and additionally perform signal conditioning, D/A conversion, and line interfacing for the copper twisted pair medium. The xDSL-CPE 240 also may implement TPS-TC, PMS-TC, MPS-TC, PMD, and analog processing and interfacing functions. As understood by a person of ordinary skill in the art a TPS-TC sublayer typically performs the functions of the functions for transport of TC streams, such as PTM-TC (PTM=packet transfer mode), STM-TC (STM=synchronous transfer mode), or ATM-TC (ATM=asynchronous transfer mode) streams, in either the upstream or downstream direction. The TPS-TC sublayer may convert data transport protocols into a format usable by the PMS-TC sublayer. As understood by a person of ordinary skill in the art, the PMS-TC sublayer typically performs the functions of transmission media specific TC functions, such as scrambling/descrambling, framing, FEC encoding/decoding, and interleaving/deinterleaving. As understood by a person of ordinary skill in the art, the MPS-TC sublayer typically performs the functions of transparent transfer of EOC data between the management entities (VME-O, VME-R) at the opposite end of the DSL link to facilitate the management of the VTUs. As understood by a person of ordinary skill in the art, the PMD sublayer typically performs the functions of transporting a bitstream over the physical medium in both the upstream and downstream directions, including timing generation and recovery, modulation and demodulation (e.g., of DMT signals). For example, for VSDL2, the TPS-TC, MPS-TC, PMS-TC, and PMD sublayers are described in Recommendation ITU-T G.993.2, entitled "Very high speed digital subscriber line transceivers 2 (VDSL2)", dated December 2011, which is incorporated herein by reference as if reproduced in its entirety. As seen in FIG. 2's functional block diagram, the remote node's 215 processing requirement complexity may be high, and the architecture may not be conducive to loop unbundling. Additionally, the user traffic management across the fiber/copper tandem link may be suboptimal as the two technologies are loosely coupled. In order to foster equipment that is more favorable for centralized processing, changes to the conventional network architecture may be beneficial.

Disclosed herein are systems, apparatuses, and methods for PON DSL convergence architecture with a reduced remote node complexity that is amenable for rising fiber/copper access networks. Methods are proposed to create a low complexity remote node that may serve as a termination of the optical fiber and a drop-point for the copper wires to the customer premises. Operator side DSL functionality may be decomposed to the following: (1) a digital processing function which includes the TPS-TC, PMS-TC, MPS-TC, PMD sublayers, and related functions and (2) an analog processing function which includes all transmission protocol interfacing and related functions. These functions may be distributed between an OLT and a remote node. Thus, some DSL functionality may be placed in an OLT. The disclosed embodiments may solve complexity issues of the remote node and may alleviate the management of the copper link, as well as potentially making it better suited for local loop unbundling. Additionally, packet processing techniques, traffic management, and the copper access signaling methodology may be appropriately adapted to correspond to the distributed functionalities in the OLT, remote node, and CPE.

Figure 3:
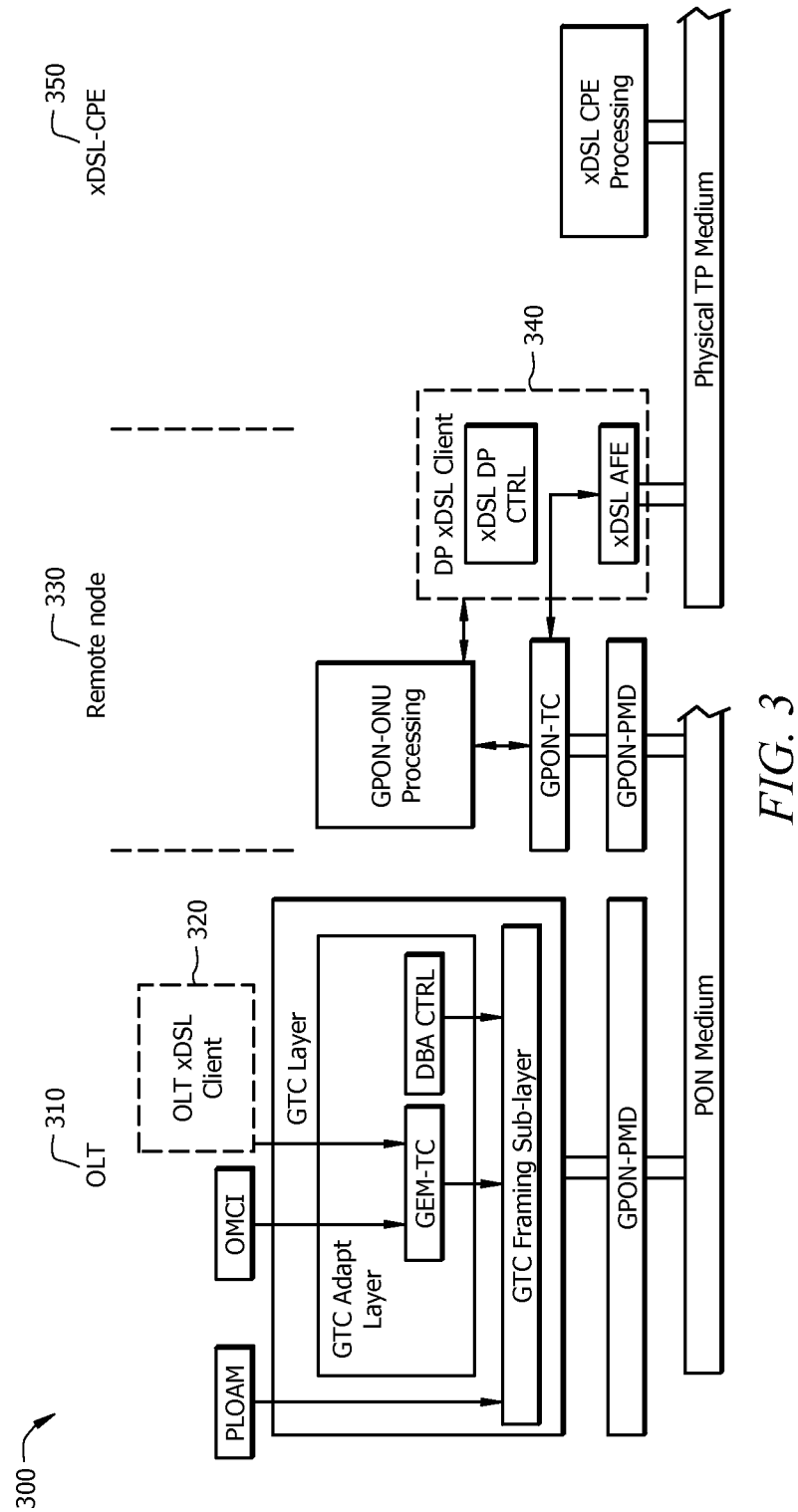
FIG. 3 is a schematic diagram of an embodiment of network architecture with a simplified remote node of lower complexity.

FIG. 3 is a functional diagram of a PON DSL architecture 300 based on distributed DSL processing for the fiber/copper access network. The architecture 300 may comprise an OLT 310, a remote node 330, and an xDSL-CPE 350. The operator side DSL functionality may be partitioned into an OLT xDSL Client 320, which is integrated into the OLT 310, and a DP xDSL Client 340, which is part of the remote node 330. The GPON functions may be further elaborated in the OLT 310 and the remote node 330 to clarify the logical placement of the OLT xDSL Client 320 and the DP xDSL Client 340, respectively. As compared to conventional PON DSL architecture, such as the architecture 200 in FIG. 2, the newly defined architecture 300 has a highly simplified remote node in the optical/copper access network. The ONU function may be simplified at the remote node and the DP xDSL Client 340 may be reduced to some buffers (memory), simple processing, D/A conversion, and interfacing to the copper.

Figure 4:
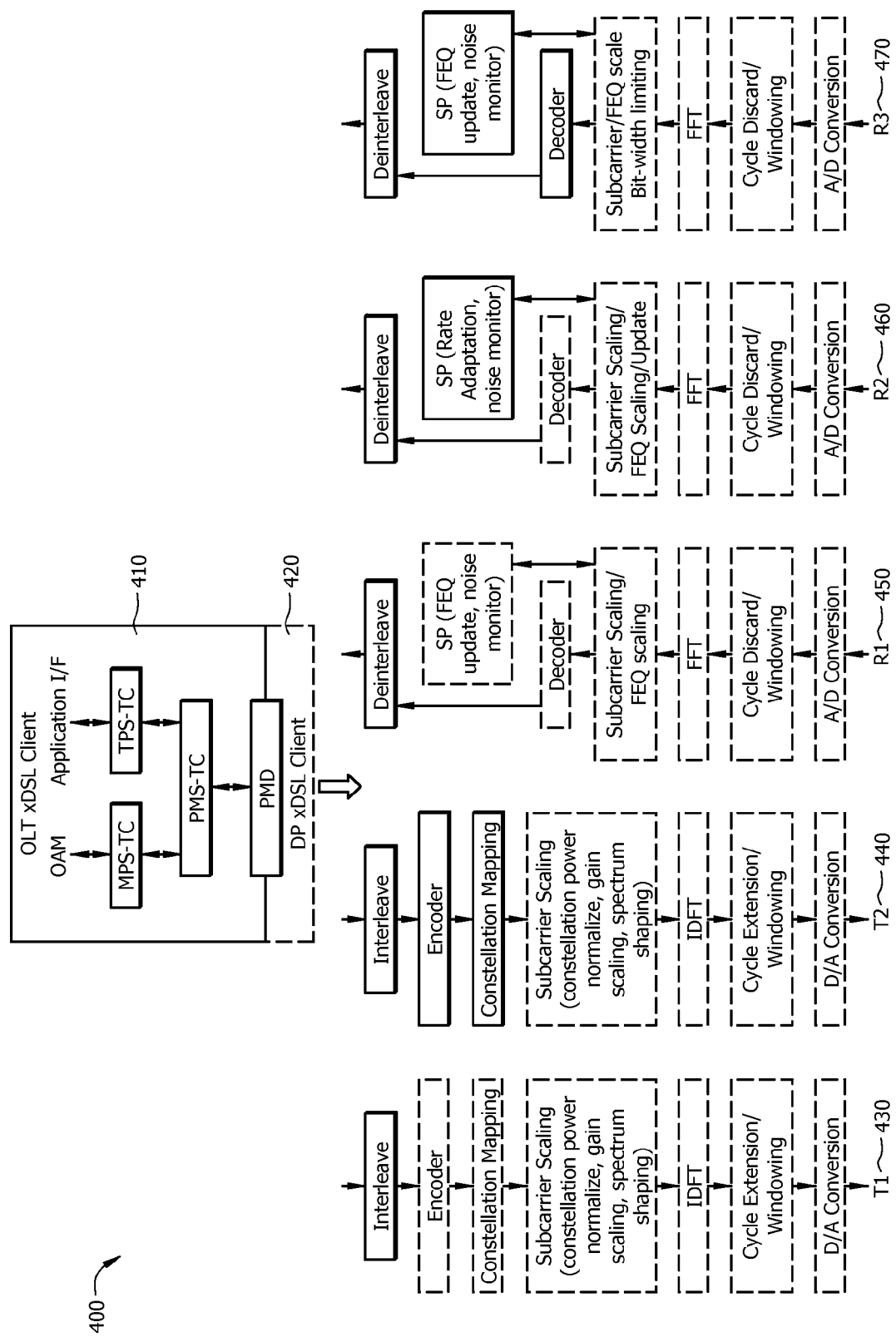
FIG. 4 is a schematic diagram of a DSL functional implementation with embodiments of transmitter and receiver function options.

FIG. 4 is a schematic of a DSL functional implementation 400 with embodiments of the transmitter (T1 430-T2 440) and receiver (R1 450-R3 470) function options. The implementation 400 may comprise an OLT xDSL client 410 and a DP xDSL client 420. The distributed processing functions partitioned between the OLT xDSL Client 410 and the DP xDSL client 420 may comprise transmitter function options T1 430 and T2 440 and receiver function options R1 450, R2 460, and R3 470. Note that the dotted lines in embodiments 430-470 indicate that the function is implemented in the DP xDSL client 420, and the solid lines indicate that the function is implemented in the OLT xDSL client 410. For example, in transmitter embodiment T1 430, the DSL encoding function is in the DP xDSL client 420, whereas in transmitter embodiment T2 440, the DSL encoding function is in the OLT xDSL client 410. The encoding function of FIG. 4 refers to trellis encoding, whereas FEC (not shown) may be performed prior to interleaving. Option T1 430 may be a case when the entire TX PMD function is implemented on the remote node. That is, DSL forward error correction encoding (labeled as "encoder"), constellation mapping, subcarrier scaling (including constellation power normalization, gain scaling, and spectrum shaping), IDFT, cyclic extension/windowing, and D/A conversion functions may be performed in the DP xDSL client 420. As understood by a person of ordinary skill in the art, many of these functions relate to DMT modulation or demodulation. In option T1 430 all TPS-TC and PMS-TC functions, including, interleaving may be performed in the OLT xDSL client 410. For option T2 440, additionally, the encoding and mapping functions may be performed in the OLT xDSL client 410, with the other functions shown being performed in the DP xDSL client 420. In option T2 440, the packed constellations for the sub-carriers may be transported over the optical link to the remote node. The DP xDSL client 420 may then scale each sub-carrier, perform an IFFT, D/A conversion, and send the signal over the copper link.

For the receiver side, three embodiments are shown in FIG. 4 in which various functions may be moved to the OLT xDSL client 410. Option R1 450 may implement the entire PMD on the DP xDSL client 420. That is, in option R1 450 A/D conversion, cyclic discard/windowing, FFT, subcarrier scaling/FEQ scaling, decoding (labeled as "decoder"), and signal processing (SP) functions may be performed in the DP xDSL client 420. The SP functions may comprise FEQ updating, DSL on-line reconfiguration (OLR), and/or noise monitoring. OLR procedures of the PMD function provide a means for adapting to slowly varying channel conditions. The noise monitoring function implements the necessary signal processing to compute a receiver's SNR for each of the sub-carriers and across the receiver's frequency band(s). In option R2 460 the DSL signal SP functions may be performed in the OLT xDSL client 410. In option R3 470, both the decoding and signal processing functions may be moved to the OLT xDSL client 410. R3 470 may be minimal DP implementation as it may include the A/D conversion, FFT, digital scaling, and lastly a per sub-carrier bit width limiter. After the sub-carrier scaling, the bit-width limiting function may truncate the words based on the constellation sizes, followed by packing into a frame for transport on the PON uplink. However, option R3 470 may come with a bandwidth penalty on the PON link.

For each of the transmitter and receiver embodiments discussed above, the PON link may need to transport the xDSL framing overhead in the TPS-TC, PMS-TC, and PMD functions. This overhead may be required for the embedded OAM channel, the TPS-TC framer, the Reed-Solomon (RS), and trellis encoder. Furthermore, the overhead may be different for each application scenario since the DSL configuration is application dependent. For example, video streaming may be considered for system design as it is a high latency, high bandwidth application. In this case, the main overhead is caused by the RS (~8%) and trellis encoder (~5%) for a total overhead of ~13%. Except for option R3 470, the transmitter and receiver embodiments may not add any significant amount to this minimum overhead. Moreover, the additional overhead required to run the decoder on the OLT xDSL client 410 for option R3 470 may be calculated. For example, a 1 Gbit/s DSL link running at 25K baud may use 4000 carriers, with an average 10 bits per carrier. If it is assumed that the 10 bits/carrier need on the average 7 bits (42 dB) dynamic range at the decoder input, the bit width limiting is 7×2=14 bits/sub-carrier. Consequently, for option R3 470, the additional overhead on the PON link is around 40%, proving it not to be a practical embodiment. Embodiments T2 440 and R2 460 may be assumed to be used for the transmitter and receiver functions, respectively, in the target xDSL-CO functional implementation for the remainder of the discussion. Essentially, the TPS-TC, MPS-MC, PMS-TC, encoder, constellation mapper, and the entire xDSL-CO firmware may be moved from the remote node to the OLT device in order to enhance functionality of the OLT.

Figure 5:
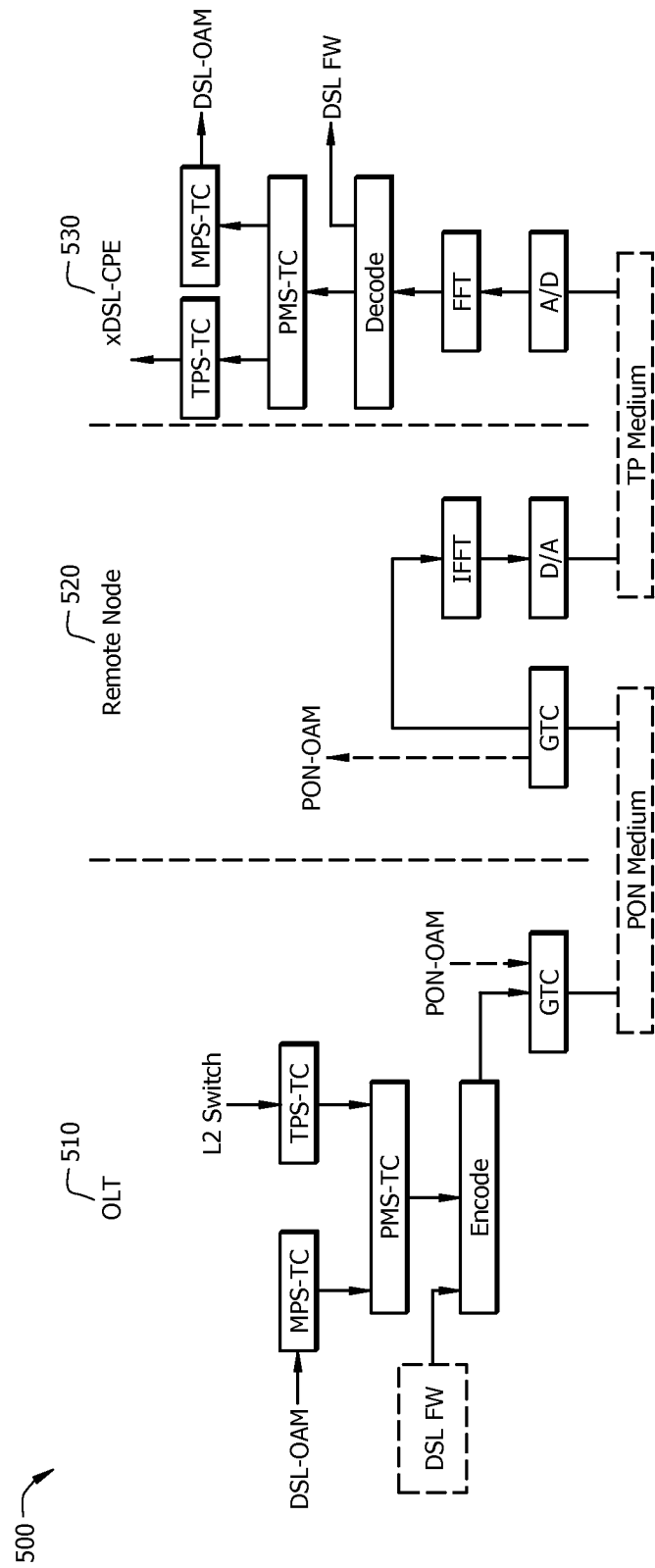
FIG. 5 is a schematic diagram of an embodiment of DSL downstream architecture.

FIG. 5 is an embodiment of xDSL downstream architecture 500 in which there may be minimal DSL firmware on a remote node. The downstream architecture 500 comprises an OLT 510, a remote node 520, and an xDSL-CPE 530. At the OLT 510, the Ethernet frames forwarded from the L2 switch function may be framed by the TPS-TC function. The OLT 510 may then perform all MPS-TC and PMS-TC related functions including any interleaving. The data bits may then be encoded to DSL constellations in the PMD function and subsequently buffered for GEM encapsulation and transport on the fiber link by the OLT 510 optical function, which for the sake of brevity is simply illustrated as GTC framing sublayer function. The GTC sublayer and associated GTC protocol functions may separate the native PON data, which could be PON-OAM, as illustrated, from the DSL data which is illustrated as being forwarded to the IFFT processing block in the DP xDSL client. At the remote node 520, the optical function may extract the data from the GEM frames and redirect them to the appropriate DSL port. Next, the remote node 520 may perform scaling, IFFT, D/A, and interfacing functions before transfer over the TP medium. At the CNU device, the frames may be processed using the appropriate DSL standard protocol. In this embodiment, most of the processing and DSL protocol functions may be performed on the OLT 510, with the counterpart of these functions on the xDSL-CPE 530 side. The DSL FW module may be a processor programmed or configured to perform the DSL protocols. The DSL FW may control the MPS-TC, PMS-TC, and the TPS-TC configuration and/or processing functions. The DSL FW also may generate DSL protocol-specific data to initialize a DSL link, may include procedures configure the remote node, and other related software-centric functions.

Figure 6:
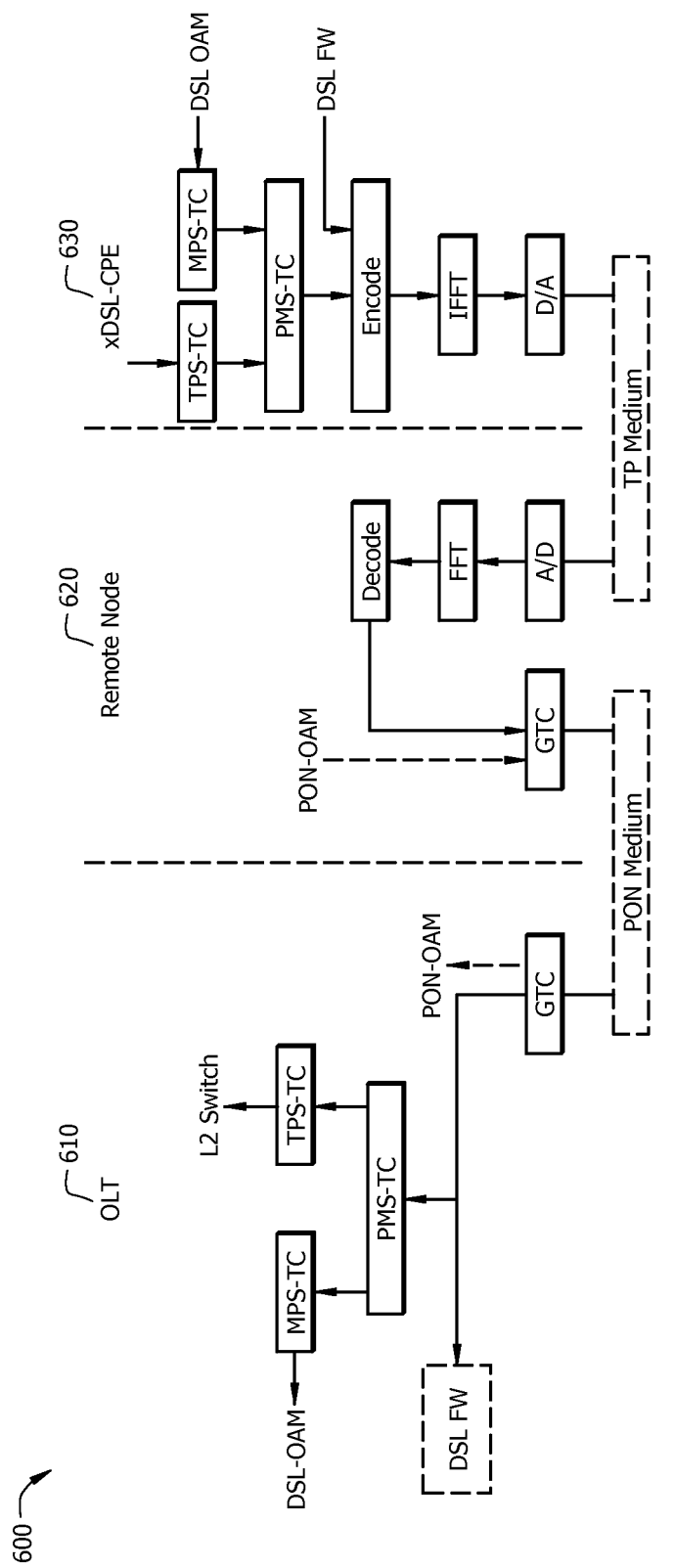
FIG. 6 is a schematic diagram of an embodiment of DSL upstream architecture.

FIG. 6 is an embodiment of xDSL upstream architecture 600 in which a CNU or CPE may implement the entire transmit xDSL function. The upstream architecture 600 comprises an OLT 610, a remote node 620, and an xDSL-CPE 630. At the remote node 620, the received frames over the TP medium may be decoded, and the decoder output bitstream may be packed for transmission over the PON medium. The ONU functions at the remote node, for the sake of brevity is simply illustrated as GTC sublayer framing function. The GTC sublayer and associated GTC protocol functions, multiplex traffic from the different DSL ports with the PON-OAM according to the BWmap corresponding with the upstream burst. At the OLT 610, the data from the GTC frame is demultiplexed for each burst, and then forwarded to the appropriate port of the OLT xDSL client function, using the GEM and DSL port ID information. The xDSL client function may then complete the entire PMS-TC, MPS-TC, and TPS-TC function, and the DSL firmware may reside on the OLT 610 device.

Figure 7:
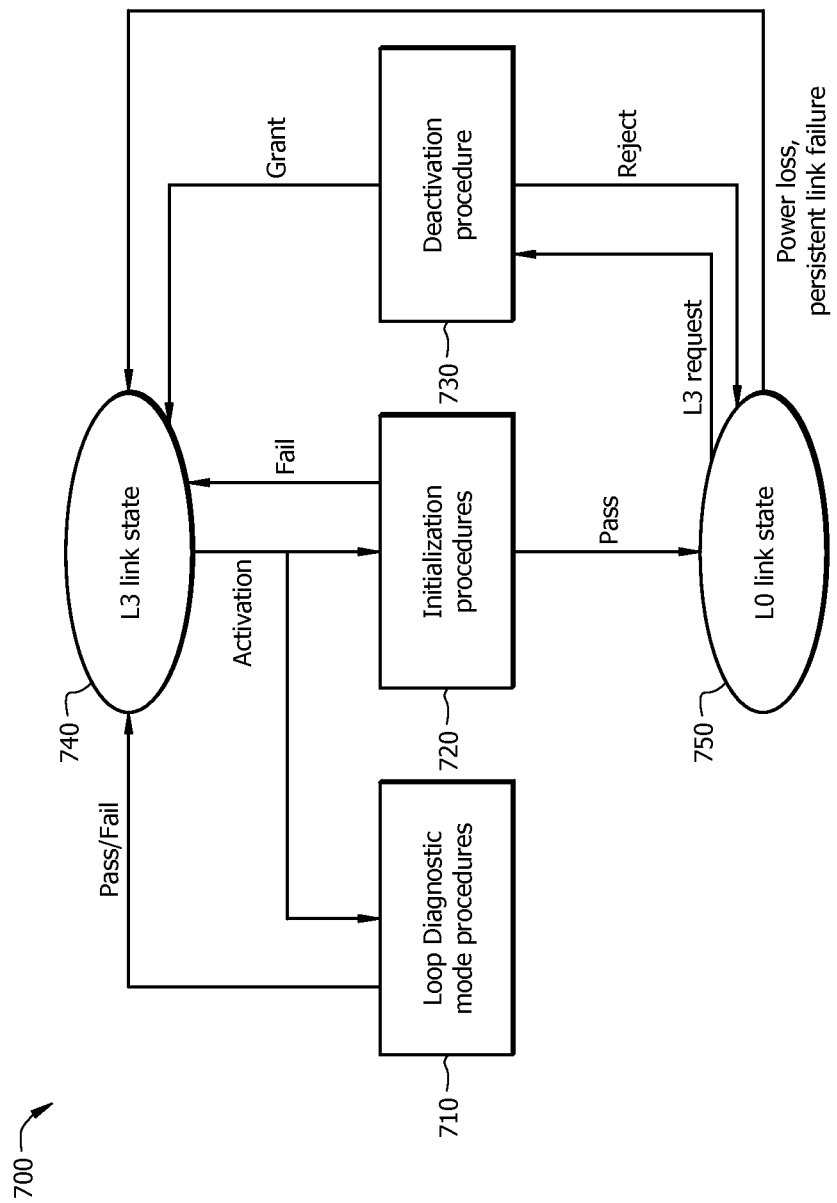
FIG. 7 is a VDSL2 link state and activation/deactivation procedures diagram.

FIG. 7 is a VDSL2 link state and activation/deactivation procedures diagram 700. The diagram 700 is reproduced from ITU-T G.993.2 VDSL2 Standard. The diagram 700 may comprise loop diagnostic mode procedures 710, initialization procedures 720, deactivation procedure 730, an L3 link state 740, and an L0 link state 750. The procedures shown may allow transition between the two link states. In the L3 link state 740, the VDSL transceiver units located at either the operator or remote user ends may not transmit any signal. The transition to the L0 link state 750 may be achieved after the initialization steps have been accomplished by the transceiver units. Following a power loss or removal, the link state may return back to the L3 link state 740. An xDSL-CO device may require different data flows during the different procedures, as well as during the transitions to the L0 link state 750 and L3 link state 740, in which link states may have different packet flows between the xDSL-CO and CPE devices. The data type exchanged in these flows may be part of the control, management, or user planes, and each flow may have different bandwidth, performance, and real-time requirements.

An embodiment in FIG. 3 may highly simplify the control and management plane functions at the remote node. Since the xDSL-CO firmware is integrated in the OLT 310 stack, it may now be managed locally at the OLT 310. To manage the xDSL-CPE 350 device, the OAM frames as defined by the current VDSL2 standard may be used. The xDSL OAM frames may be scheduled by the OLT xDSL Client in coordination with a DBA agent. The DBA agent is part of the OLT. DBA may be understood by a person of ordinary skill in the art to be PON terminology. DBA refers to the process of granting the individual transmission opportunities to the ONUs traffic-bearing entities for each GTC frame. The DBA agent can be used to facilitate the transfer of the xDSL OAM frames between the two VTUs. Additionally, the OLT xDSL Client may perform simple configuration of the remote node, and the PON OMCI and/or PLOAM procedures may be extended to support this function. For the data plane functions, the embodiment of the new network architecture may also reduce the remote node to a frame forwarding device.

Figure 8:
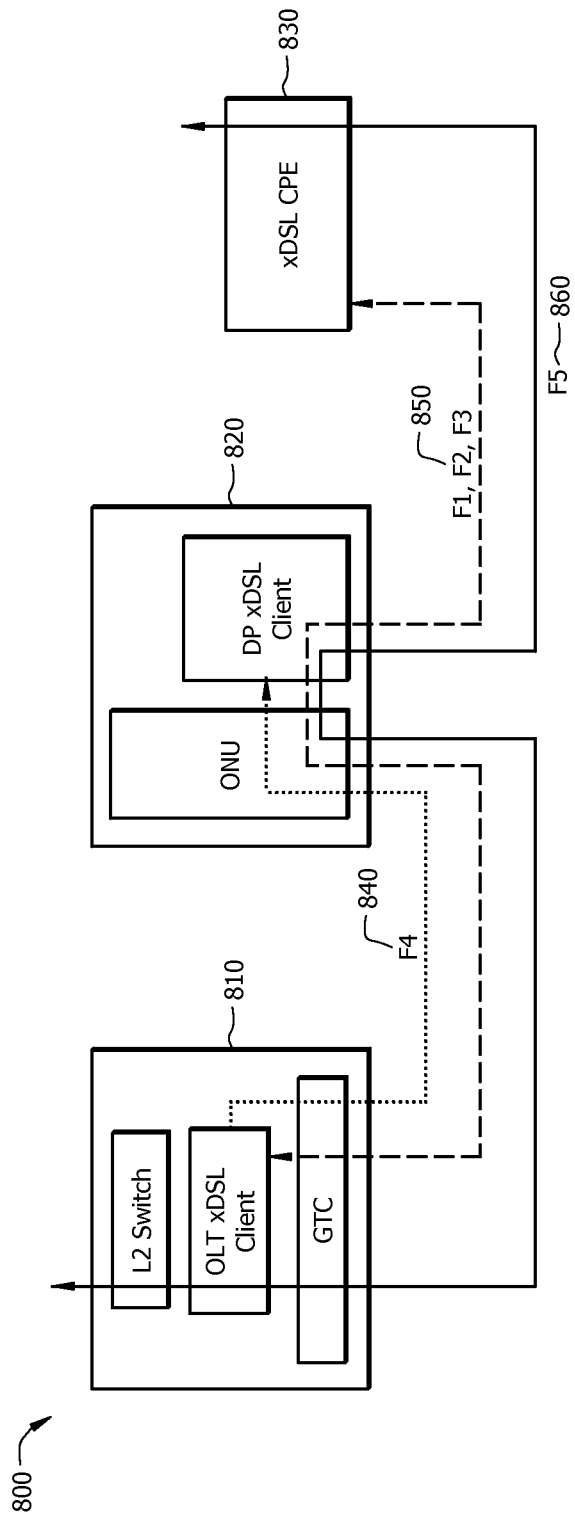
FIG. 8 is a schematic diagram of an embodiment of a traffic flow implementation.

FIG. 8 represents an embodiment of a traffic flow implementation 800 between the devices in the PON DSL network architecture. The implementation 800 may comprise traffic flows F1-F5 (840-860) between an OLT 810, a remote node 820, and xDSL-CPE 830 devices. Table 1 below summarizes the different packet flows and characteristics. During the loop diagnostics mode 710, initialization 720, and deactivation 730 procedures for the VDSL2 standard, the initialization frames F1 850 may be transmitted at a fixed bit-rate. During the L0 link state 750, synchronization frames F2 850 may be periodically transmitted for training ports of one or more CPEs (i.e., keeping VTUs at CPEs synchronized with VTUs at remote node), and downstream user payload frames F5 860 may be fragmented, prioritized, and scheduled for transmission on the PON. Similarly, in the upstream, the CNU device may transmit the user data frames F5 860 to the remote node 820, which in turn may use DBA to forward frames to the OLT 810. The DP OAM frames F4 840 may transmit from the OLT 810 and terminate at the remote node 820 in order for DP control and configuration. In an embodiment of a conventional cascaded network, e.g., as in FIG. 2, the DSL packet flows may be terminated at the remote node. However, a key element of this embodiment in FIG. 8 is that the DSL packet flows F3 850 may now be terminated at the OLT xDSL Client in the OLT device 810, which in turn simplifies the remote node 820 functionality.

TABLE 1 an example of different packet flows

| Frame | Type | Use | Characteristics |
|---|---|---|---|
| F1 | Initialization frames | Port training | Port dependent, fixed bit-rate |
| F2 | Synchronization frames | Port training | Port dependent, periodic, fixed bit-rate |
| F3 | DSL OAM frames | OAM | xDSL control and configuration |
| F4 | DP OAM frames | DP configuration | DP control and configuration |
| F5 | User Data frames | User payload | Traffic-class dependent |

The conventional architecture in FIG. 2 may require the remote node 215 to reconstruct the upstream Ethernet packets, implement layer-2 classification and prioritization logic, and then forward to the uplink. However, this complexity in the remote node 215 may be reduced by requiring the CNU devices to classify all input streams at the U-interface and enforce upstream QOS function. The remote node 215 may then implement a fair scheduler to multiplex the upstream decoded streams. The fair scheduler may be low complexity.

Figure 9:
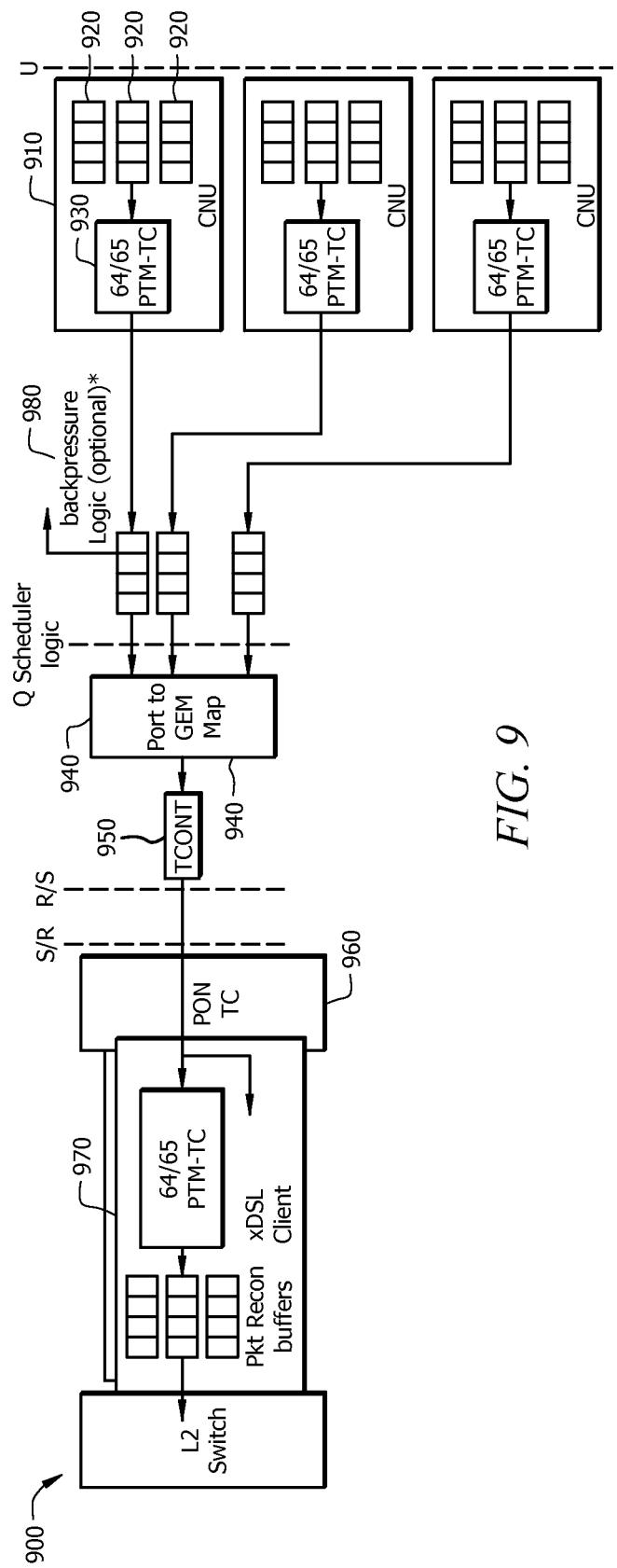
FIG. 9 illustrates an embodiment of upstream queuing and scheduling in a PON DSL architecture.

FIG. 9 illustrates an embodiment of upstream queuing and scheduling in a PON DSL architecture 900. The architecture 900 may comprise CNU devices 910, multiple user ports 920, 64/65-octet encapsulation block 930 (labeled as 64/65 PTM-TC), a port to a GEM map 940, T-CONT 950, PON TC 960, OLT xDSL Client 970, and backpressure logic 980. The CNU devices 910, which may each be connected to multiple user ports 920, perform VID (as defined in the IEEE 802.1Q standard) and P-bit (or PCP, priority code point, which define a 3-bit IEEE 802.1p priority) classification to support different priority/traffic classes for voice, data, and video. For clarity, only one CNU device in FIG. 9 is numbered, but all CNU devices illustrated have the same structure. The xDSL TPS-TC sublayer function may then schedule the transmission of the frames using 64/65-octet encapsulation 930 over the copper link. On the remote node, the decoded xDSL frames for each port may be mapped to the GEM frames 940 and associated with the single T-CONT 950 for upstream scheduling on the PON 960. The PON 960 may carry these decoded frames for further receiver processing by the OLT xDSL Client 970 on the OLT device. The DP may implement a cascaded buffering scheme in which a buffer is assigned to each xDSL port followed by the T-CONT 950 buffer. In this way, the port buffers may be monitored together with the T-CONT 950, and back pressure logic 980 may be applied to the appropriate CNU(s) 910 if either buffer hits a high water mark. To reduce the buffering requirements at the DP, a simple PMD layer based backpressure logic 980 may be used in the downstream scheme. For this purpose, a few subcarriers may be reserved in the downstream to signal the buffer status.

Figure 10:
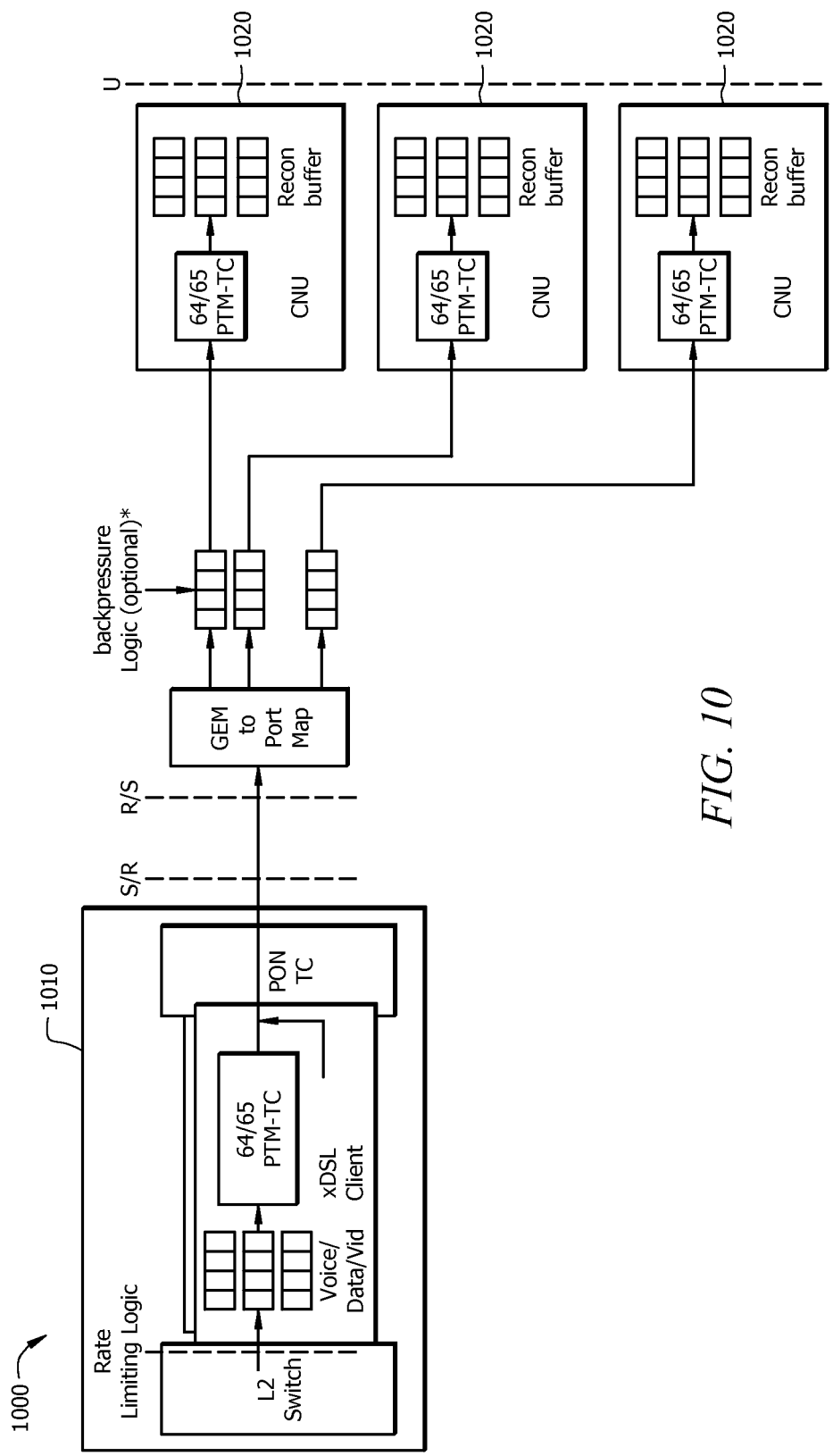
FIG. 10 illustrates an embodiment of downstream queuing and scheduling in a PON DSL architecture.

FIG. 10 illustrates an embodiment of downstream queuing and scheduling in a PON DSL architecture 1000. The architecture 1000 may comprise an OLT device 1010 and a plurality of CNU devices 1020. In the traditional cascaded network in FIG. 2, the OLT 210 may transmit Ethernet frames to the remote node 215 where the xDSL-CO 230 may perform service classification and the 64/65-octet encapsulation TPS-TC sublayer function. Alternatively, as shown in FIG. 10's architecture 1000, the OLT device 1010 may perform layer-2 functions, which may also include per-port rate limiting to help pace the slower FTT-DP ports on the copper link. The OLT 1010 may transmit the GEM encapsulated DSL constellations from the OLT xDSL client. At the remote node, the downstream constellations may be modulated on to the subcarriers for transmission on the copper link. The remote node may also encode a few subcarriers to transmit the receive buffer status to a CNU 1020 for upstream flow control function. This flow control mechanism may provide significant savings in the overall buffer requirements on the remote node.

In conventional hybrid fiber/copper access networks, all DSL signaling and protocol functions may be terminated at a DSLAM function in a remote node. Although the copper link employs an "always ON" model, the DSLAM may only forward user payload to the uplink fiber connection. Similarly in the downlink, the DSLAM may transmit "idle" packets to the CPE if no user data is available in order to keep the link "always ON." An embodiment of the disclosed architecture in FIG. 3 may move certain DSLAM functions from the remote node 330 to the OLT device 310. In this new architecture, all packets that reach the remote node 330 in the downstream (except for some control packets) may be forwarded to the CNU. Similarly, in the upstream, all packets from the CNUs to the remote node 330 may be forwarded to the OLT 310 in order to simplify packet forwarding processes. During the times when there are no useful packets from either of the F1 through F5 flows shown in FIG. 8, the optical link may not be used to carry "idle" traffic as defined in the TPS-TC function in the DSL standards. In order to avoid this inefficiency, a key component of this disclosure is to move away from the "always ON" model in the current DSL standards to an "on demand" transmission scheme.

In an embodiment of an "on demand" downstream transmission scheme, the OLT may transmit all required packets from F1-F5 flows, which include port training, OAM, synchronization, and user payload packets. Furthermore, the DP xDSL Client may shut off the transmitter for any port that has no data queued from the OLT, and the CNUs may implement signal detection techniques and listen to the DP transmitter for valid symbols to decode. Similarly, for an embodiment of the "on demand" upstream transmission scheme, the CNUs may transmit all required packets from F1-F5 flows and subsequently shut off the transmitter for any symbol that there is no data. The DPs may implement signal detection techniques to listen to the CNU transmitter for valid symbols to decode and forward to the OLT for further processing. This "on demand" signaling method may be implemented in either a point-to-point (P2P) or point-to-multipoint (P2MP) framework for the copper access.

Figure 11:
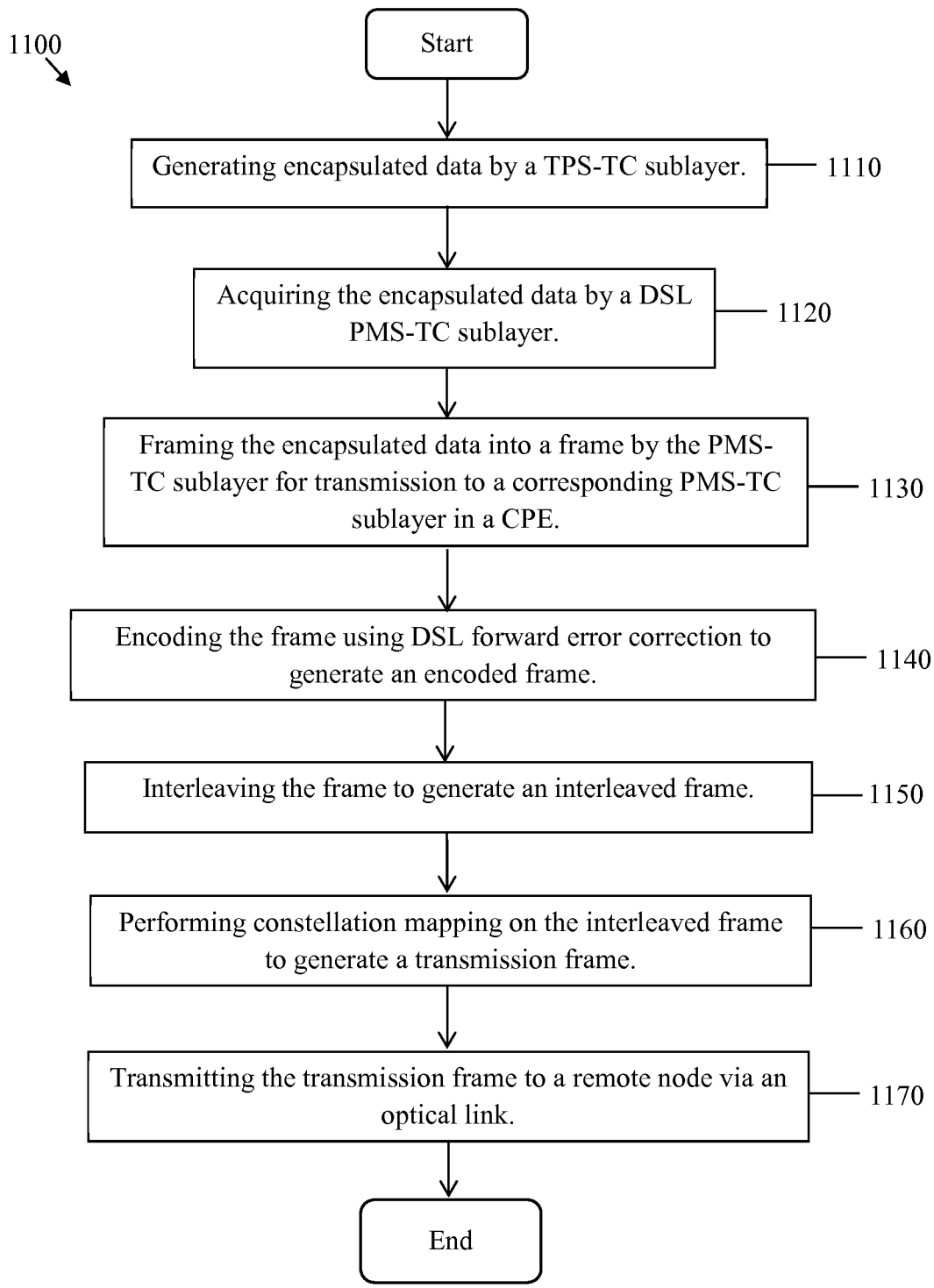
FIG. 11 is a flowchart of an embodiment of an OLT transmission method.

FIG. 11 is a flowchart 1100 of an embodiment of an OLT transmission method. The steps of the flowchart 1100 may be performed in an OLT, such as OLT 310 or OLT 510 in FIGS. 3 and 5, respectively. The flowchart 1100 begins in block 1110, in which a TPS-TC sublayer generates encapsulated data. The TPS-TC sublayer may receive data for encapsulation from an application interface. Next in block 1120, the DSL PMS-TC sublayer may acquire the encapsulated data from the TPS-TC sublayer. Next in block 1130, the PMS-TC sublayer may frame the encapsulated data into a frame. The PMS-TC sublayer in the OLT may have a peer PMS-TC sublayer in a CPE, and the frame may be destined for the peer PMS-TC sublayer in the CPE. In block 1140, the frame may be encoded using DSL FEC to generate an FEC encoded frame. In block 1150, the encoded frame may be interleaved, e.g., with another encoded frame, to generate an interleaved frame. In block 1160, the bits of the encoded frame may be mapped to a symbol constellation (e.g., using quadrature amplitude modulation or trellis coded modulation) for DMT modulation to generate a transmission frame. Finally, in block 1170, the transmission frame may be transmitted to a remote node via an optical link. The transmission frame may comprise a DSL frame that the remote node will forward to a CPE via a copper link. The transmission frame may be encapsulated in a GPON frame for transmission over the optical link to a remote node. The remote node may remove the GPON encapsulation and transmit the remaining DSL frame to the remote node. The TPS-TC and PMS-TC sublayers may be as described with respect to FIGS. 4 and 5. The interleaving, encoding, and constellation mapping of FIG. 11 may be as described, for example, with respect to T2 440 in FIG. 4.

Figure 12:
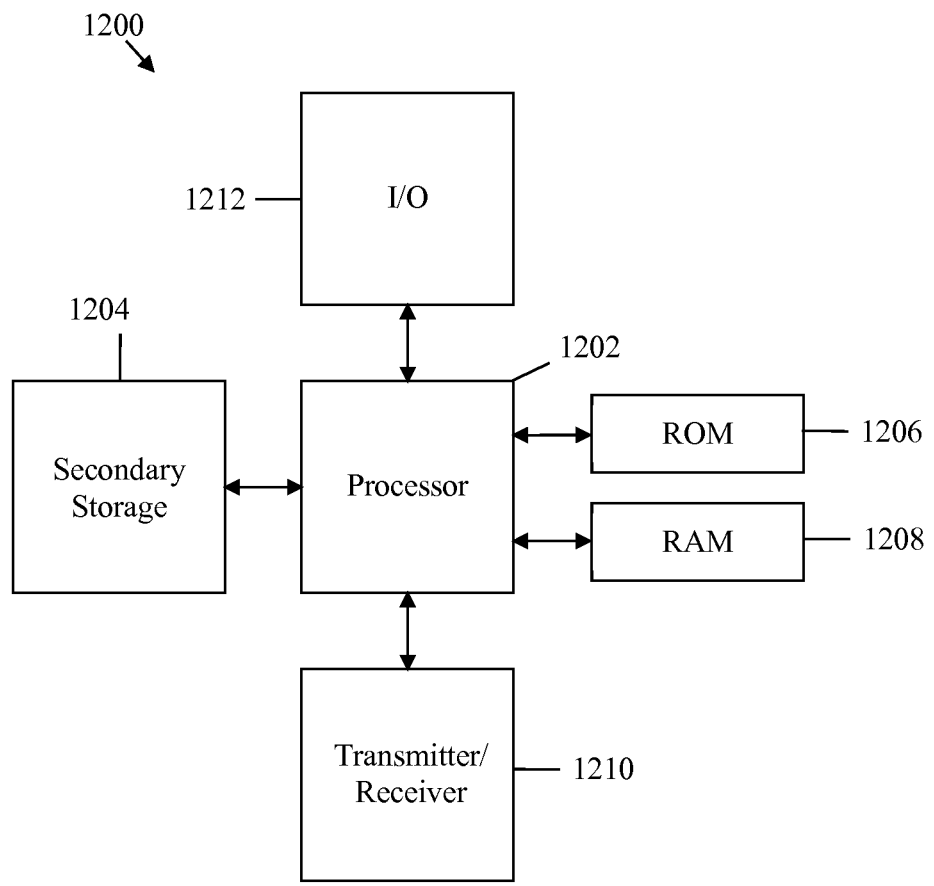
FIG. 12 is a schematic diagram of an embodiment of a general-purpose computer system.

FIG. 12 illustrates a computer system 1200 suitable for implementing one or more embodiments of the components disclosed herein. The computer system 1200 includes a processor 1202 (which may be referred to as a CPU) that is in communication with memory devices including secondary storage 1204, read only memory (ROM) 1206, random access memory (RAM) 1208, input/output (I/O) devices 1212, and transmitter/receiver 1210. The processor 1202 may be implemented as one or more CPU chips, or may be part of one or more application specific integrated circuits (ASICs) or digital signal processors (DSPs).

Processor 1202 may implement or be configured to perform any of the functionality or algorithms described above for CPEs, remote nodes, and/or OLT devices, such as downstream or upstream processing described above, e.g., the OLT 510, remote node 520, or CPE 530 in FIG. 5, e.g., the OLT 610, remote node 620, or CPE 630 in FIG. 6, or upstream or downstream traffic management described above, e.g., the processing disclosed in FIGS. 9 and 10 and the related description. Further, the processor 1202 may be configured to implement all or part of the flowchart 1100.

The secondary storage 1204 typically comprises one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

The transmitter/receiver 1210 may serve as an output and/or input device of the computer system 1200. For example, if the transmitter/receiver 1210 is acting as a transmitter, it may transmit data out of the computer system 1200. If the transmitter/receiver 1210 is acting as a receiver, it may receive data into the computer system 1200. The transmitter/receiver 1210 may take the form of modems, modem banks, Ethernet cards, universal serial bus (USB) interface cards, serial interfaces, token ring cards, fiber distributed data interface (FDDI) cards, and/or other well-known network devices. These transmitter/receiver devices 1210 may enable the processor 1202 to communicate with an Internet or one or more intranets. If the computer system 1200 is configured as an OLT, the transmitter/receiver 1210 may, e.g., transmit data bits via a PON medium to a remote node. The transmitter/receiver 1210 may be controlled by the processor 1202. The transmitter/receiver 1210 may, e.g., receive data bits via a PON medium from a remote node.

I/O devices 1212 may include a video monitor, liquid crystal display (LCD), touch screen display, or other type of video display. I/O devices 1212 may also include one or more keyboards, mice, or track balls, or other well-known input devices.

It is understood that by programming and/or loading executable instructions onto the computer system 1200, at least one of the processor 1202, the secondary storage 1204, the RAM 1208, and the ROM 1206 are changed, transforming the computer system 1200 in part into a particular machine or apparatus, e.g., an OLT or CPE, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Therefore, the computer system 1200 may be configured as an OLT, a remote node, or a CPE as described herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of communicating using an optical line terminal (OLT), the method comprising:
   acquiring encapsulated data by a digital subscriber line (DSL) physical media specific transmission convergence (PMS-TC) sublayer from a transmission protocol specific transmission convergence (TPS-TC) sublayer; and
   framing the encapsulated data into a frame by the PMS-TC sublayer for transmission to a corresponding PMS-TC sublayer in a customer premises equipment (CPE);
   mapping, by a Gigabit Passive Optical Network (GPON) transmission convergence framing sublayer, the frame from the PMS-TC sublayer to GPON encapsulation method (GEM) frames for transmission over a passive optical network (PON) link;

encoding, prior to mapping the frame from the PMS-TC sublayer to GEM frames, the frame using DSL forward error correction to generate an encoded frame;

interleaving the encoded frame to generate an interleaved encoded frame; and performing constellation mapping on the interleaved encoded frame to generate a constellation frame.

2. The method of claim 1, further comprising:

acquiring an operations and management (OAM) packet by a management protocol specific transmission convergence (MPS-TC) sublayer;

encapsulating the OAM packet by the MPS-TC sublayer; and providing the encapsulated OAM packet to the PMS-TC sublayer.

3. The method of claim 2, further comprising framing the encapsulated OAM packet into a second frame by the PMS-TC sublayer.

4. The method of claim 3, further comprising:

encoding the second frame using DSL forward error correction to generate a second encoded frame; and performing constellation mapping on the encoded frame to generate a second transmission frame.

5. The method of claim 4, further comprising transmitting the second transmission frame to a remote node via an optical link.

6. The method of claim 1, further comprising:

receiving decoded DSL frames from a remote node; and perform bit rate adaptation based on the decoded DSL frames.

7. The method of claim 1, further comprising generating the encapsulated data by the TPS-TC sublayer.

* * * * *